Figure 1:
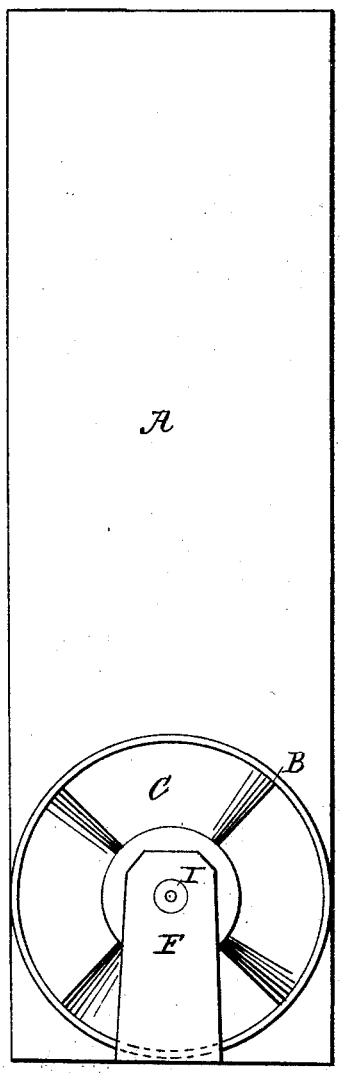

C. B. HOARD.

Clock Winder.

No. 27,721.

Patented April 3, 1860.

Witnesses
J. Dennis Jr
Edw. F. Brown

Inventor
C. B. Hoard

UNITED STATES PATENT OFFICE.

CHARLES B. HOARD, OF WATERTOWN, NEW YORK.

MEANS FOR WINDING THE SPRINGS OF CLOCKS BY CURRENTS OF AIR.

Specification forming part of Letters Patent No. 27,721, dated April 3, 1860; Reissued February 19, 1861, No. 1,140.

*To all whom it may concern:*

Be it known that I, CHARLES B. HOARD, of Watertown, in the county of Jefferson and State of New York, have invented a new and useful Improvement in Clocks or other Timepieces or Apparatus for Winding Them; and I do hereby declare that the same is described and represented in the following specifications and drawings.

To enable others skilled in the art to make and use my improvement I will proceed to describe its construction and operation referring to the drawings in which the same letters indicate like parts in each of the figures.

Figure 2:
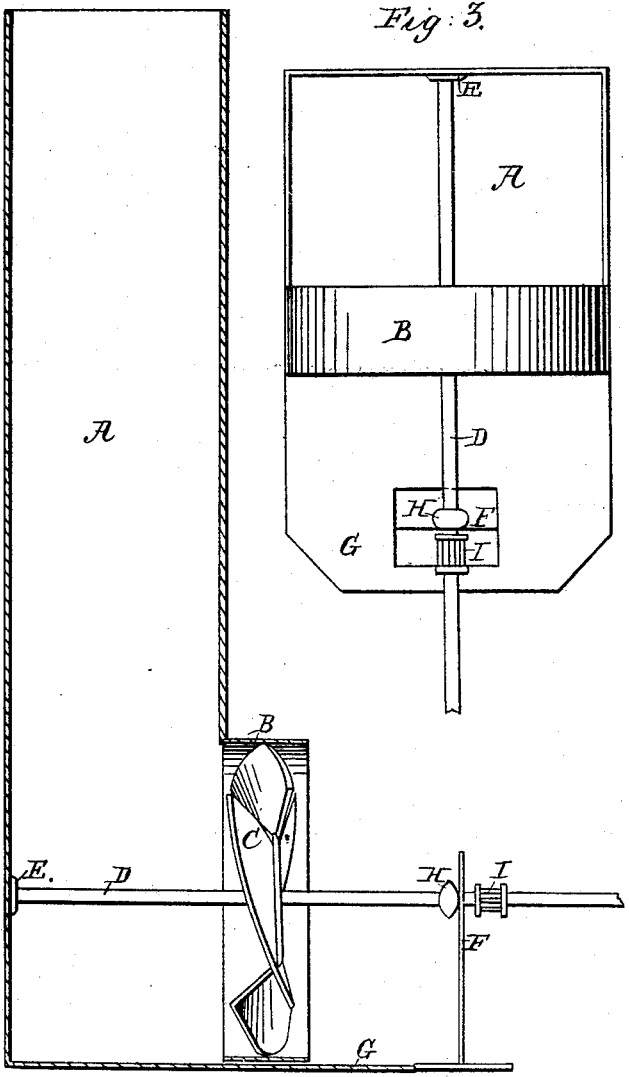
Figure 3:
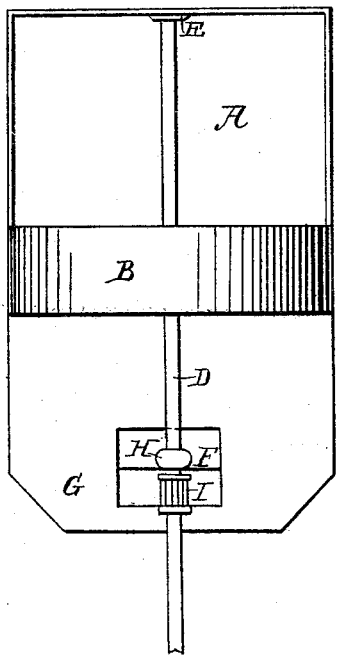

Figure 1, is an elevation of my apparatus for winding up the weights or springs which propel clocks or other time pieces. Fig. 2, is a sectional elevation of the same. Fig. 3, is a plan or top view.

The nature of my invention and improvement consists in winding the spring of a clock or other time piece, by connecting it with an air wheel or motor, so constructed and arranged as to be actuated by currents of air.

In the accompanying drawings A, is a pipe or flue open at the top and closed at the bottom except a circular opening in one side surrounded by the circular flange B, for the wind wheel C, to turn in, which wheel is mounted on the shaft D, which turns in the box E, fastened to one side of the pipe A, and in the standard F, fastened to the extension of the bottom plate G, as shown in the drawings. The shaft D, has a collar H, on it to prevent it from traversing through the standard F. The pinion I, is fastened to the shaft D, so as to be turned by the wind wheel C, and drive a large gear fastened to the shaft which winds up the spring of a clock, that runs without a chain or fusee, so that the action of winding has a tendency to propel the clock and keep it running. Or this pinion I, may drive one of a long train of wheels, made to either increase or diminish the motion, from the pinion to the gear on the shaft which winds up the spring of the clock above mentioned. And if it is more convenient or desirable to arrange the wind wheel and pinion at some distance from the clock, the motion may be communicated to the shaft that winds up the spring of the clock, by means of gears, and one or more long shafts, or by means of a long cord or band running around pulleys, or such other convenient means may be introduced between the shaft of the wind wheel, and the shaft of the clock that winds up the spring that operates it. Thus it will be apparent that by using one or more long shafts or bands the wind wheel may be placed on the top of the house or in such other position as may be desirable.

The wind wheel C, is made just large enough to turn freely inside of the circular flange B, so as to be turned by the current of air entering or issuing from the pipe A. This wind wheel is represented as being made with a series of inclined arms or blades J, J, which arms or blades may be more or less in number and made in the form shown, or in such other form, as may be preferred or will answer the purpose, of giving motion to the shaft D, by the action of a current of air blowing against them. This wind wheel may be arranged in an opening from the room, in which the clock is placed to be propelled by it, into a chimney or air flue, so that the draft or current of air flowing from, or into said room will propel the wheel and wind the clock. Or a wind wheel may be placed in an aperture from the room to the open air, or to some other room or passage, so that the draft into or from the room produced by the change of temperature, between day and night or otherwise, will be sufficient to wind up a clock or other time piece, so as to keep it constantly running, and by the aid of proper appliances the wheel may be made to wind the clock when turned in either direction, or by currents of air flowing alternately in opposite directions. Or the wheel may be so constructed with vibrating arms or blades, as to turn the same way or in the same direction when propelled by currents of air moving by it in either direction. This wind wheel may be made to wind up a weight or weights, or springs with chains to propel clocks, or time pieces provided they have a proper retaining power, to continue the motion while the wind wheel is winding up the weights or springs.

I contemplate that skilful mechanicians will make such modifications of my improvements as will adapt them to such circumstances as they may wish to use them without departing from the principles or merits of my invention.

I believe I have described and represented my improvements in clocks or other time pieces or apparatus for winding them so as to enable any person skilled in the art to make and use them.

I will now state what I desire to secure by Letters Patent, to wit.

I claim—
Winding the spring of a clock or other time piece, by connecting it with an air wheel or motor, so constructed and arranged as to be actuated by currents of air.

C. B. HOARD.

Witnesses:
I. DENNIS, Jr.,
EDW. F. BROWN.